United States Patent
Tarasinski (10) Patent No.: US 8,276,726 B2
(45) Date of Patent: Oct. 2, 2012

(54) GEARBOX SHIFTING POINT FOR PRODUCING A ROTATIONALLY FIXED CONNECTION BETWEEN AT LEAST ONE GEARWHEEL AND ONE SHAFT

(75) Inventor: Nicolai Tarasinski, Frankenthal (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/212,781

(22) Filed: Aug. 18, 2011

(65) Prior Publication Data

US 2012/0036953 A1   Feb. 16, 2012

Related U.S. Application Data

(62) Division of application No. 11/680,157, filed on Feb. 28, 2007, now abandoned.

(30) Foreign Application Priority Data

Mar. 7, 2006 (DE) .......................... 10 2006 010 356
Jun. 21, 2006 (DE) .......................... 10 2006 028 479

(51) Int. Cl.
*F16D 27/04* (2006.01)

(52) U.S. Cl. ................................... 192/48.2; 192/48.91

(58) Field of Classification Search ............... 192/84.92, 192/84.2
See application file for complete search history.

(56) References Cited

U.S. PATENT DOCUMENTS

| | | | |
|---|---|---|---|
| 2,969,134 A | 1/1961 | Wiedmann et al. | |
| 6,886,425 B2 | 5/2005 | Petzold | |
| 7,219,571 B2 | 5/2007 | McCrary | |
| 7,770,480 B2 | 8/2010 | Martin | |

FOREIGN PATENT DOCUMENTS

DE         10040207         8/1999

*Primary Examiner* — David D Le
*Assistant Examiner* — Ryan Dodd (57) ABSTRACT

A gearbox shifting point for producing a rotationally fixed connection between at least one gearwheel and one shaft. The gearbox shifting point comprises a shaft, a shifting sleeve and two gearwheels. The two gearwheels are each rotatably mounted in relation to the shaft. The shifting sleeve is mounted in a rotationally secured fashion on the shaft. The shifting sleeve and the gearwheels are embodied in such a way that a positively locking, rotationally fixed connection can be produced between the shifting sleeve and in each case one gearwheel. In order to improve problems with respect to a gearshifting hole or blockage of the gearbox, the shifting sleeve interacts with the two gearwheels in such a way that at least one positively locking, rotationally fixed connection is always produced between the shifting sleeve and one of the gearwheels.

16 Claims, 5 Drawing Sheets

GEARBOX SHIFTING POINT FOR PRODUCING A ROTATIONALLY FIXED CONNECTION BETWEEN AT LEAST ONE GEARWHEEL AND ONE SHAFT

CROSS REFERENCE TO RELATED APPLICATION

This application is a division of U.S. application Ser. No. 11/680,157, filed 28 Feb. 2007 now abandoned and titled GEARBOX SHIFTING POINT FOR PRODUCING A ROTATIONALLY FIXED CONNECTION BETWEEN AT LEAST ONE GEARWHEEL AND ONE SHAFT.

FIELD OF THE INVENTION

The invention relates to a gearbox shifting point for prod a rotationally fixed connection between at least one gearwheel and one shaft. The gearbox shifting point comprises a shaft, a shifting sleeve and two gearwheels. The two gearwheels are each rotatably mounted in relation to the shaft. The shifting sleeve is mounted in a rotationally secured fashion on the shaft. The shifting sleeve and the gearwheels embodied in such a way that a positively locking, rotationally fixed connection can be produced between the shifting sleeve and, in each case, one gearwheel. The present gearbox shifting point is quite particularly preferably provided for an infinitely variable change-speed gearbox or a power shift gearbox of an agricultural or industrial utility vehicle, in particular a tractor.

BACKGROUND OF THE INVENTION

A plurality of infinitely variable change-speed gearboxes are known from the prior art, said gearboxes being composed of a combination of an infinitely variable variator and a change-speed gearbox in order to provide a sufficient adjustment range, and in which gearboxes the gearshifting elements are shifted with an approximately synchronous rotational speed. In this context, the gearboxes are shifted on the one hand by means of frictionally locking clutch elements (multi-plate clutches) and on the other hand by means of positively locking clutch elements (claw clutches). In these gearboxes, all the shifting points also have a disengaged or decoupled position (neutral) in addition to the engaged or coupled position, no torque being transmitted via the shifting point in said neutral position, in order to activate the clutch elements, all the gearboxes use hydraulic systems which are implemented, for example, by ring cylinders which are entrained in rotation, the oil for activation being fed via rotary bushings.

In gearboxes with shifting points with synchronous rotational speeds is particularly important, in order to bring about jolt-free operation, for the gearshifting process to take place at the correct/suitable time and at the same time for there to be neither an interruption in the force transfer (gearshifting hole) nor blockage of the gearbox in which both gearshifting elements of the synchronous shifting point are activated simultaneously.

The hydraulic actuators of a gearbox shifting point, which are used in the prior art, have shifting times of the order of magnitude of 100 ms and more. In addition, the shifting times are dependent on the oil pressure, the oil temperature and the oil viscosity, and, in the case of the rotating cylinders, they are also dependent on the rotational speed of the cylinder. In other words, the shifting times of a gearbox shifting point which is known from the prior art therefore vary. In addition, the shifting times change in an unpredictable way if a clutch cylinder cannot reach its end positions between two shifting operations which follow one another in brief succession.

SUMMARY OF THE INVENTION

The present invention is therefore based on the object of specifying and developing a gearbox shifting point of the type mentioned at the beginning which can overcome the aforementioned problems. In particular, a gearbox shifting point is to be specified and developed in which the properties relating to the gearshifting hole or blockage of the gearbox are improved.

An object of the invention is to provide a gearbox having a shifting point for producing a rotationally fixed connection between at least one gearwheel and one shaft, wherein a shifting sleeve is provided that interacts with two gearwheels in such a way that at least one positively locking rotationally fixed connection is always produced between the shifting sleeve and one of the gearwheels.

If a positively locking, rotationally fixed connection is present between the shifting sleeve and a gearwheel, this state is also referred to below as the engaged state.

Firstly, according to the invention, it has been recognized that the gearbox shifting point, in principle, does not have a gearshifting dead spot, since the gearbox shifting point does not have a neutral position and thus does not have an interruption of the force transfer between the shaft and at least one gearwheel. This is implemented, in particular, by means of the mechanical embodiment of the individual components, specifically the shifting sleeve and the two gearwheels, of the gearbox shifting point, and by their arrangement on the shaft. Since the gearbox shifting point according to the invention does not have a neutral position, a gearshifting process can be carried out only if the shifting sleeve and the gearwheel which is to be engaged with the shifting sleeve essentially have the same rotational speed, that is to say rotate synchronously in relation to one another. For this reason, the gearbox shifting point according to the invention can quite particularly advantageously be used in a double variator gearbox or in a gearbox which are known, for example, from WO 2005/090108 A1 or DE 10 2005 044 180.7 which was not yet laid open on the application date of the present patent application. Since the gearbox shifting point, according to the invention, can be used in particular in the gearbox arrangements of the two last-mentioned patent applications, the entire disclosure content of these two patent applications is also included here. Synchronicity at the gearbox shifting point can thus be produced by virtue of the fact that, for example, a gearbox branch which meshes with one gearwheel can be driven by an internal combustion engine and a gearbox branch which meshes with the second gearwheel can be driven by a variator or an electric machine. If a rotationally fixed connection is then produced between the first gearwheel and the shaft and switching over to a rotationally fixed connection between the shifting sleeve and the second gearwheel is to take place, the variator of the second gearbox branch would have to be operated in such a way that there was synchronicity between the shifting sleeve and the second gearwheel. In this operating state it is then possible to move the shifting sleeve from its rotationally fixed connection to the first gearwheel into a rotationally fixed connection to the second gearwheel, in which case, during the switching over process, there is, owing to the embodiment of the gearbox shifting point—at least one positively locking, rotationally fixed connection is always produced between the shifting sleeve and one of the gearwheels—a rotationally fixed connection between the shaft and both the first and second gearwheels. In this state, a torque transfer is possible onto the shaft between the first gearbox branch and the first gearwheel, on the one hand, and a torque transfer is possible at the same time onto the shaft between the second gearbox branch and the second gearwheel, on the other hand. If the shifting sleeve is only in an engaged state with the second gearwheel, there is only torque transfer present between the second gearbox branch and the shaft, in other words, with the gearbox shifting point according to the invention it is possible to switch over in a quite particularly advantageous way, in this exemplary embodiment, between the two gearbox branches without the force transfer being interrupted.

In a quite particularly preferred embodiment, the shifting sleeve is arranged spatially between the two gearwheels. In the process, the two gearwheels could be arranged at a predefined and essentially invariable longitudinal position of the shaft, in each case in a rotatable fashion in relation to the shaft. The shifting sleeve which is mounted in a rotationally secured fashion on the shaft could be arranged on the shaft in such a way that it can be moved into an engaged state with on gearwheel an for the other in the longitudinal direction of the shaft.

There is quite particularly preferably provision for the shifting sleeve and the two gearwheels to be arranged and embodied in such a way that at least one operating state in which a rotationally fixed, positively lacking connection is present between the shifting sleeve and the two gearwheels is provided. As already indicated, in this operating state, a torque transfer is implemented at the same time between the two gearwheels and the shaft, that is to say for example between the two gearbox branches which respectively mesh with one of the two gearwheels and the shaft. The shaft could, for example, be utilized as an output shaft of a drive train of a tractor, with which ultimately at least one wheel of the tractor can be driven.

The shifting sleeve particularly preferably has clutch teeth which can engage clutch teeth provided on a gearwheel and has the purpose of producing a positively locking connection.

The shifting sleeve quite particularly preferably has two sets of clutch teeth. Each of the two gearwheels has clutch teeth. The clutch teeth are embodied in such a way that an engagement with an overlap is always present between the clutch teeth of the shifting sleeve and a gearwheel. The shifting sleeve could, for example, have one set of clutch teeth on its left-hand end (with respect to the longitudinal axis of the shaft), and a further set of clutch teeth on its right-hand end. The left-hand clutch teeth of the shifting sleeve could engage in clutch teeth of a gearwheel, this gearwheel being arranged to the left of the shifting sleeve. The right-hand clutch teeth of the shifting sleeve could engage clutch teeth of a gearwheel which is arranged to the right of the shifting sleeve. So that the various clutch teeth described above always have an engagement with an overlap, the outer distance between the left-hand clutch teeth of the shifting sleeve and the right-hand clutch teeth of the shifting sleeve is larger in the longitudinal direction of the shaft than the inner distance between the clutch teeth of the left-hand gearwheel and the clutch teeth of the right-hand gearwheel.

Clutch teeth of a gearwheel or of the shifting sleeve could have axial or radial claws, i.e., the claws extend essentially in the axial or radial direction with respect to the longitudinal axis of the shaft.

Specifically, the various clutch teeth could be pointed, or embodied with a flat roof. Alternatively, or additionally, the clutch teeth could be of undercut or deflecting design. If the clutch teeth are embodied in an undercut fashion, a greatly reduced activation force, if at all, has to be applied to the shifting sleeve after the gearshifting process in order to terminate the gearshifting process. If the clutch teeth are of deflecting design, after a gearshifting process has taken place an activation force on the shifting sleeve has to be maintained in order to maintain an engaged shifted state.

Low-friction movement of the shifting sleeve in relation to the shaft can be obtained if the shifting sleeve is mounted on the shaft by means of roller bodies and is thus arranged so as to be easily displaceable in the axial direction of the shaft This may be achieved, for example, by means of balls which are provided between the shaft and the shifting sleeve.

In one quite particularly preferred embodiment, the shifting sleeve has an armature ate or is connected to an armature plate. The shifting sleeve can be activated by means of this armature plate. The armature plate could be arranged essentially concentrically with respect to the shaft and/or rotatably with respect to the shifting sleeve. If the armature plate is embodied mounted on the shifting sleeve or in one part with the shifting sleeve, the armature pirate rotates as it were with the shifting sleeve and, the shaft. In this case it is expedient to construct the armature plate in the form of a disc and therefore to arrange it concentrically with respect to the shaft or shifting sleeve. If the armature plate is embodied so as to be rotatable with respect to the shifting sleeve, a groove in which part of the armature plate engages could be provided on the shifting sleeve. Therefore, if the armature plate is moved in the axial direction of the shaft, the shifting sleeve is thus also moved in the axial direction, since the armature plate engages in, or comes to rest in, the groove of the shifting sleeve with a part facing the shifting sleeve.

The armature plate is particularly preferably arranged so as to be moveable in the axial direction in relation to the shifting sleeve (and thus also in relation to the shaft). This could be a distance of 1 to 10 cm in length, and the armature plate is arranged so as to be able to freely move over said distance in the axial direction in relation to the shifting sleeve. If appropriate, the armature plate could be capable of being forced into a predefined position with a prestressing force. This could be done with a correspondingly dimensioned and arranged spring. The moveable arrangement of the armature plate in relation to the shifting sleeve allows the armature plate firstly to be accelerated over part of the shifting path without at the same time the shifting sleeve being moved or entrained in the axial direction. As soon as the armature plate strikes a stop which is provided on the shifting sleeve, a breaking loose force of the shifting sleeve, which is possibly present, is quickly and effectively overcome by the impulse which is caused by it. The axial mobility of the armature plate in relation to the shifting sleeve could, for example, be limited using stops which are provided on the shifting sleeve.

It would then be possible to provide for the shifting sleeve to be activated mechanically or hydraulically by means of the armature plate. It would thus be possible, for example, for the armature plate to be activated solely by means of a mechanical lever arm arrangement, but in this case it would be necessary to take appropriate measures (for example to bring about synchronicity between the shifting sleeve and gearwheel to be engaged) to ensure that the gearbox shifting point can be activated in a purely mechanical way. Alternatively or additionally it would be possible to activate or move the armature plate and thus the shifting sleeve by means of a hydraulic actuator. In this context too it would initially be necessary to ensure that synchronicity is present between the shifting sleeve and gearwheel which is to be engaged before a control unit outputs a shifting command to a hydraulic valve which is correspondingly provided so that a hydraulic actuator (for example an annular piston which is arranged so as to be moveable in the axial direction of the shaft) can have pressurized hydraulic fluid applied to it, which causes the gearshifting process to be carried out.

In a quite particularly preferred embodiment, the shifting sleeve can be activated by means of the armature plate with at least one electromagnet. As a result, when an electromagnet is activated, the armature plate could be attracted or repelled by a magnetic field which is generated by the activated electromagnet. If the armature plate has a ferromagnetic material, for example iron or steel, the armature plate is attracted by the magnetic field of the electromagnet. Alternatively to this the armature plate could have a material which produces a repulsion force between the electromagnet and the armature plate, for example a permanently magnetic material.

In one cost-effective embodiment, it would be possible to provide just one electromagnet with which the armature plate or the shifting sleeve can be moved counter to a prestressing force. Accordingly, the prestressing force which is made available, for example, by a correspondingly dimensioned and arranged spring prestresses the armature plate or the shifting sleeve into a first, engaged position. When the electromagnet is activated, the armature plate or the shifting sleeve is moved counter to the prestressing force into the second, engaged position. Accordingly, the electromagnet or its coil and the electric current which flows through the coil are to be configured in such a way that in all cases the prestressing force can be overcome so that the shifting sleeve can be moved into the second, engaged position.

In one quite particularly preferred embodiment, two electromagnets with which the armature plate or the shifting sleeve can be moved between the engaged shifted states of the gearbox shifting point are provided. A gearshifting process of the gearbox shifting point or of the shifting sleeve can thus be carried out by virtue of the fact that the first electromagnet, which is possibly activated, is deactivated and the second deactivated electromagnet is activated. In this case, the coil of the one electromagnet is no longer supplied with an electric current, and the coil of the other electromagnet is supplied with an electric current by means of a control unit and a correspondingly provided power electronic system, and the gearbox shifting point can therefore be activated by an electrical switching over process. In an arrangement with two electromagnets, it would also be possible to provide for the shifting sleeve to be prestressed so that when the control unit fails a predefined shifted state of the gearbox shifting point occurs.

The electromagnet could have a pot magnet. Alternatively or additionally, the electromagnet could be arranged mounted in a gearbox housing. If the electromagnet is mounted in the gearbox housing and attracts the armature plate in its activated operating state, the armature plate comes to rest against the electromagnet or its core. Correspondingly, the armature plate must be arranged so as to be rotatable in relation to the shifting sleeve so that when the armature date is secured in this operating state the shifting sleeve and the shaft can still rotate.

The electromagnet could be arranged mounted on the shaft and/or at least one electromagnet could be integrated into the shifting sleeve. In this embodiment, the electromagnet rotates with the shaft or the shifting sleeve, in this case, the electromagnet could be supplied with electrical energy by means of sliding contacts.

In a quite particularly preferred embodiment, the gearbox shifting point according to the invention has a control unit. A gearshifting process of the shifting sleeve can be actuated with this control unit. It would thus be possible, as already indicated, for the hydraulic actuator or the at least one electromagnet to be actuated by the control unit.

At least one rotational speed sensor could be provided in particular to bring about synchronicity between the shifting sleeve and a gearwheel which is to be engaged with the shifting sleeve. The rotational speed of one of the two gearwheels could be determined indirectly or directly with this rotational speed sensor. Accordingly, the rotational speed sensor is to be arranged at a suitable location, preferably in an area near to the gearwheel, so that the rotational speed of this gearwheel can be determined directly with it. The rotational, speed sensor could, however, also be arranged and embodied in such a way that it detects the rotational speed of another rotating component—for example a shaft of a gearbox branch rotatably connected to the gearwheel—indirectly. Quite particularly preferably, two rotational speed sensors are provided, and the rotational speed of a gearwheel can be detected directly with each of said rotational speed sensors.

The control unit could be programmed in such a way that a suitable or a favorable timing point for a gearshifting process of the gearbox shifting point can be determined by reference to the rotational speed information of the at least one rotational speed sensor. Such a suitable timing point is present, in particular, if the rotational speed conditions or the torque conditions are favorable for a gearshifting process. Such a rotational speed sensor could, for example, have a Hall sensor which generates an electrical signal and feeds it to a control unit. The rotational speed of the rotating component could be determined in the control unit by means of the electrical signal of the rotational speed sensor.

Quite particularly preferably at least one means with which the strength of the current which can be applied to the at least one electromagnet can be measured is provided. As a result it is possible, on the one hand, to check that this electromagnet is activated. On the other hand, through knowledge of the current strength of the current flowing through this electromagnet and the properties of the electromagnet (geometry of The core and of the coil as well as the number of the windings in the coil) it is possible to determine the strength of the magnetic field generated by the electromagnet. Accordingly, it is possible to determine the instantaneous activation force of the armature plate or of the shifting sleeve in a contactless fashion.

Preferably, at least one sensor with which the magnetic field strength or the magnetic transfer density can be detected in an area near to the electromagnet or the armature plate or at some other suitable location is provided. Such a sensor could be secured to a gearbox housing. By using such a sensor it is possible to determine the instantaneous position of the armature plate or of the shifting sleeve so that a control device of the gearbox shifting point can be provided with appropriate feedback, specifically as to whether or not a specific state of the gearbox shifting point for which commands have been received has actually been assumed or is present.

The activation force which is applied to the armature plate should at least be configured in such a way that it is possible to activate the shifting sleeve even when there is a maximum force transfer between a gearwheel and the shaft. This is necessary in particular if the clutch teeth provided on the shifting sleeve and on the gearwheels is of undercut design and an appropriate activation force has to be applied in order to release a positively locking, rotationally fixed connection between a gearwheel and the shifting sleeve.

In one quite particularly preferred embodiment, the electromagnet is actuated using a control device or with a method for actuating an actuator according to one of the claims of DE 10 2005 039 263 which was not yet published at the application time of this patent application. Reference is made below to the control device or to the method for actuating actuator to DE 10 2005 039 263. Therefore, the entire disclosure contents of this patent application are included here. This is provided for the cases in which the electromagnet has at least one coil, and if appropriate, a core.

If the armature plate or the shifting sleeve is to be moved into a state in which it can moved counter to a prestressing force or counter to an activation force which is indicated above, an electric current of a predefined first current strength is applied to the coil of the electromagnet. This first current strength is dimensioned in such a way that the force acting on the armature plate from the magnetic field of the electromagnet is of such a magnitude that in all cases the movement of the armature plate can be carried out together with the shifting sleeve counter to the prestressing force or activation force.

In order to keep the armature plate in the state in which the shifting sleeve was to move counter to the prestressing force and in which the armature plate rests, for example, against the core of the electromagnet, an electric current of a predefined second current strength is applied to the coil of the electromagnet, the second current strength being smaller than the first current strength. The armature plate is attracted by the magnetic field of the electromagnet. Since the armature plate is arranged closer to the electromagnet in this state, it is also sufficient to keep the armature plate in this position with the electric current of the second current strength in the coil of the electromagnet since when the distance between the armature plate and the electromagnet is small (i.e. when there is a small air gap or virtually no air gap) the magnetic field is still large enough (owing to a reciprocal dependence of the magnetic field strength as a function of the distance from the electromagnet), even if the holding current necessary for this is only a fraction, for example 1/5 to 1/6 of the electric current of the first current strength which is set in order to move the armature plate and the shifting sleeve. For this reason there is provision that electric current of the first or of the second predefined current strength is applied to a coil in each case in the sense of DE 10 2005 039 263.

Although the entire disclosure contents of DE 10 2005 039 263 are also included here, reference will be made quite particularly to the fact that the current which is applied to the electromagnet can be pulsed, and in particular pulse width modulated. As a result, the energy requirement for holding the armature component in the position in which, for example, a prestressing force has to be overcome or a holding force applied, is quite particularly advantageously very small.

It is particularly preferred that a voltage of at least 90 V can be applied to an electromagnet in this way, a short shifting time can advantageously be achieved, this also requiring an appropriate embodiment of the clutch teeth and correspondingly fast interaction between the shifting sleeve and the two gearwheels.

The energy which is necessary for a gearshifting process could be obtained from an energy accumulator. Such an energy accumulator could, for example, have an electric capacitor or a battery and make available a high electric current flow per time unit.

To summarize, it can be stated that with a gearbox shifting point according to the invention, which is suitably embodied for the respective application case, it is quite particularly advantageously possible to achieve shifting times of less than 5 ms. These shifting times are not influenced either by the operating temperature of the components of the gearbox point nor by its rotational speed in any appreciable way. As a result the time in which the gearbox is blocked can be significantly reduced compared to the gearbox shifting points known from the prior art.

There are now various possible ways of advantageously configuring and developing the teaching of the present invention. For this purpose, on the one hand, reference is to be made to the patent claims which are dependent on claim 1, and on the other hard to the subsequent explanation of the preferred exemplary embodiments of the invention with reference to the drawing. Generally preferred embodiments and developments of the teaching are also explained in conjunction with the explanation of the preferred exemplary embodiments of the invention with reference to the drawing.

BRIEF DESCRIPTION OF THE DRAWINGS

In the drawing, in each case in a schematic illustration.

DESCRIPTION OF THE PREFERRED EMBODIMENT

Figure 1:
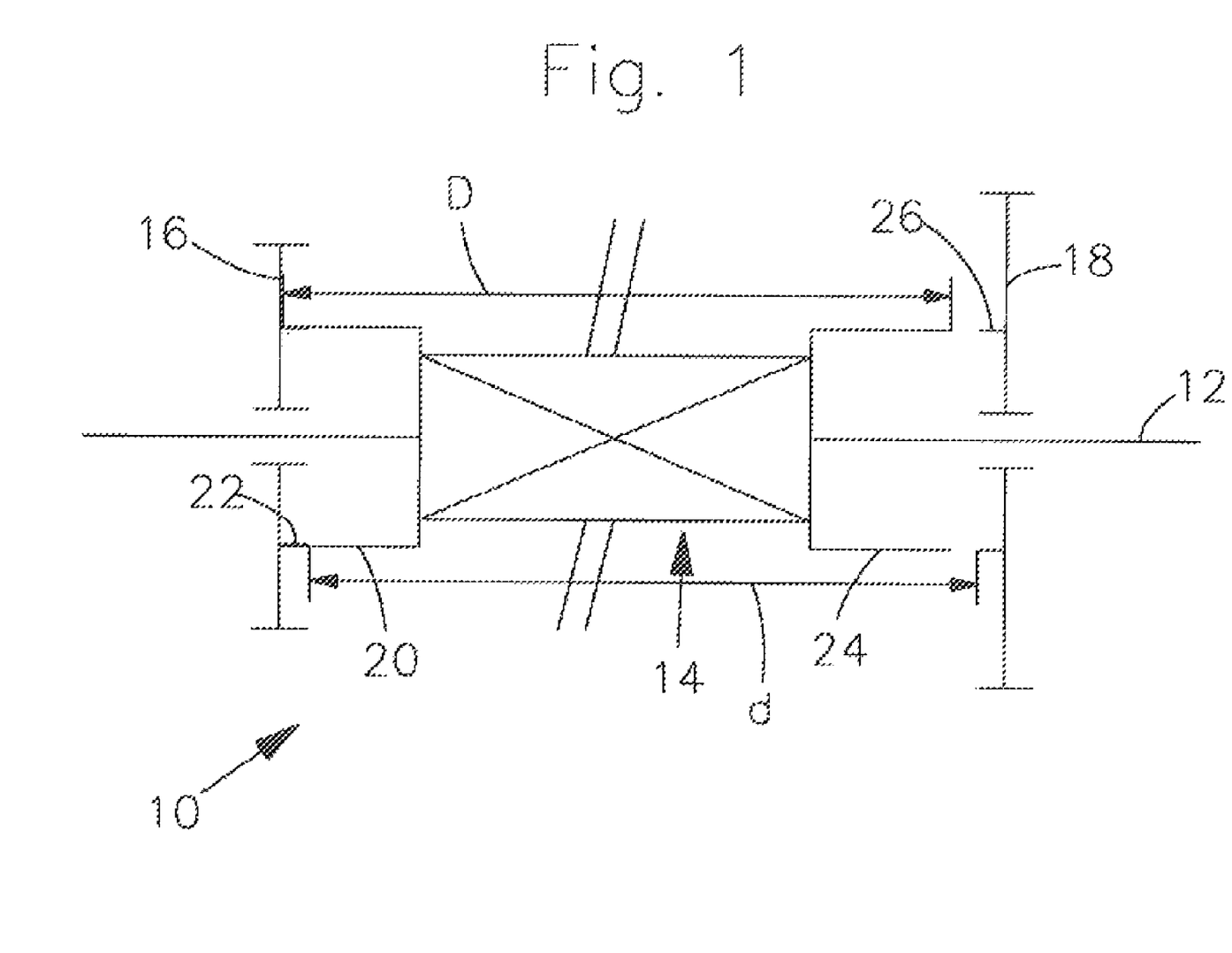
FIG. 1 shows a first exemplary embodiment of a gearbox shifting point according to the invention.

Identical or similar components are identified by the same reference symbols in the figures. FIG. 1 shows a gearbox shifting point 10 according to the invention in a schematic illustration. The gearbox shifting point 10 comprises a shaft 12 which is used, for example, as an output shaft of a drive train in a tractor (not shown in FIG. 1), and thus drives the wheels of an axle of the tractor, possibly via a differential gearbox. Furthermore, the gearbox shifting point 10 comprises a shifting sleeve 14 which is arranged in a rotationally secured fashion on the shaft 12. The shifting sleeve 14 can be moved relative to the shaft 12, in the longitudinal direction of the shaft 12. To the left, next to the shifting sleeve 14, a first gearwheel 16 is rotate mounted on the shaft 12. To the right, next to the shifting sleeve 14, a second gearwheel 18 is rotatably mounted on the shaft 12. The shifting sleeve 14 is thus arranged between the two gearwheels 16, 18 on the shaft 12.

The shifting sleeve 14 has, on the left-hand side, clutch teeth 20 which have axial claws not shown). The left-hand gearwheel 16 itself has clutch teeth 22, the clutch teeth 22 also having axial claws (not shown) and being of essentially complementary design to the clutch teeth 20 of the shifting sleeve 14. In the state of the gearbox shifting point 10 shown in FIG. 1, the shifting sleeve 14 is in engagement with the gearwheel 16. Correspondingly, owing to a rotationally secure mounting of the shifting sleeve 14 on the shaft 12, a rotationally fixed connection is present between the first gearwheel 16 and the shaft 12. The shifting sleeve 14 has, on the right-hand side, clutch teeth 24 which has axial claws (not shown). The right-hand gearwheel 18 itself has clutch teeth 26, the clutch teeth 26 also having axial claws (not shown) and being of essentially complementary design to the clutch teeth 24 of the shifting sleeve 14.

According to the invention, the gearbox shifting point 10 is embodied in such a way that the shifting sleeve 14 interacts with the two gearwheels 16, 18 in such a way that a positively locking, rotationally fixed connection is always produced between the shifting sleeve 14 and one of the two gearwheels 16, 18. This is achieved, according to the exemplary embodiment from FIG. 1, by virtue of the fact that, in the longitudinal direction of the shaft 12, the distance between the left-hand, outer end of the clutch toothing 20 and the right-hand, outer end of the clutch toothing 24 of the shifting sleeve 14—designated by D in FIG. 1—is larger than the distance between the outer end, facing the shifting sleeve 14, of the clutch toothing 22 of the first gearwheel and the outer end, facing the shifting sleeve 14, of the clutch toothing 26 of the gearwheel 18—designated by d in FIG. 1. In other words, the shifting sleeve 14 has a greater spatial extent with its two clutch toothings 20, 24 in the longitudinal direction of the shaft 12 than would be available between the inner ends of the two clutch toothings 22, 26 of the two gearwheels 16, 18 if the clutch toothings 20 to 26 were not to permit any dew-shaped engagement. As a result, at least two clutch toothings are always in engagement, for example the clutch toothings 20, 22 in the operating state of the gearbox shifting point 10 according to FIG. 1. If the shifting sleeve 14 from FIG. 1 is moved into its right-hand, engaged state, there is a certain area (which is dependent on the geometric configuration of the gearbox shifting point 10 since the distance D is larger than the distance d) of positions of the shifting sleeve 14 in which both the left-hand clutch toothing 20 of the shifting sleeve 14 is in engagement with the clutch toothing 22 of the gearwheel 16 and the right-hand clutch toothing 24 of the shifting sleeve 14 is in engagement with the clutch toothing 26 of the gearwheel 18. Therefore, if the shifting sleeve 14 assumes these positions temporarily or permanently, the clutch toothings 20 to 26 are in an engagement with an overlap.

Figure 2:
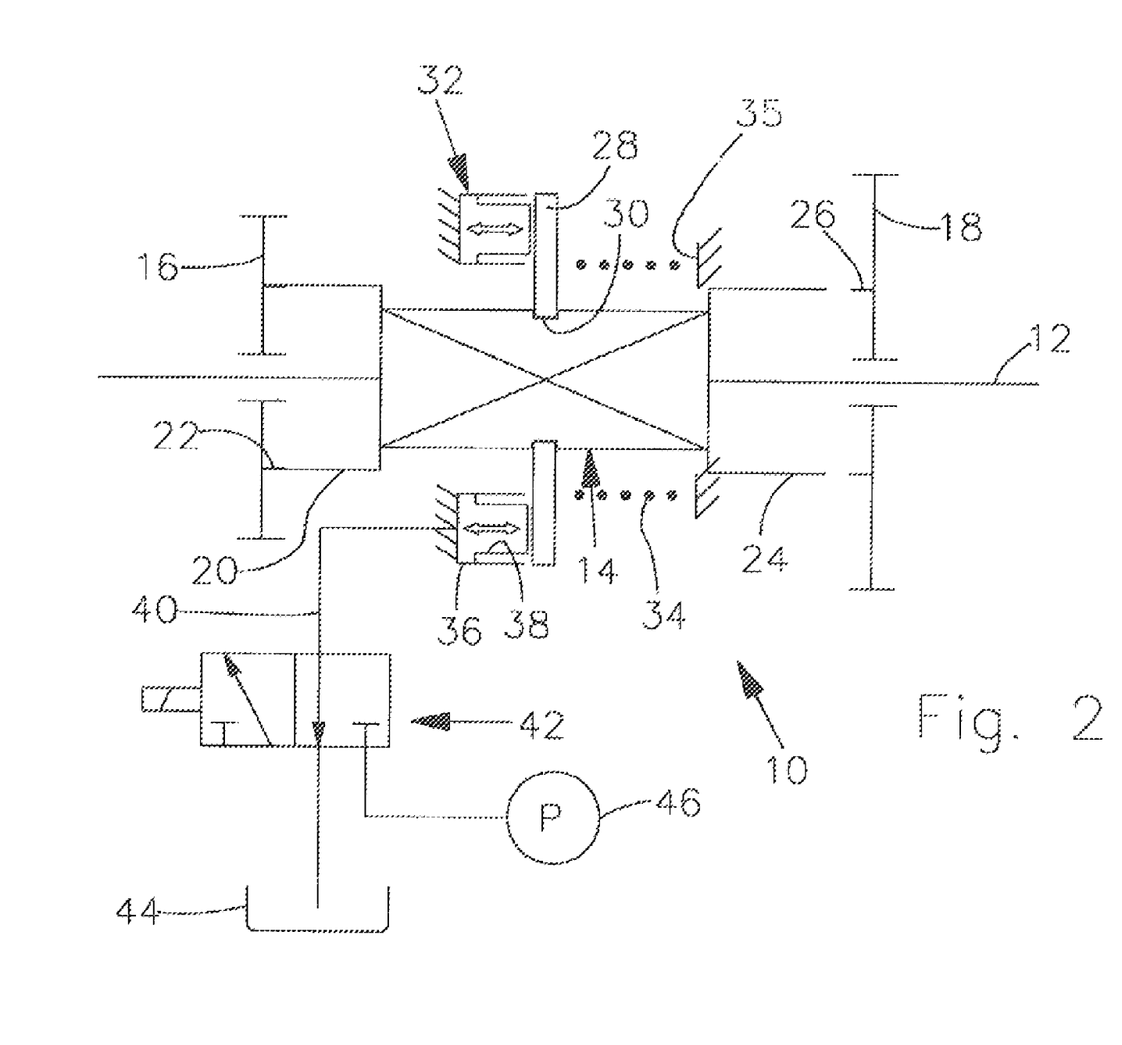
FIG. 2 shows a second exemplary embodiment of a gearbox shifting point according to the invention which is of a hydraulically activated design.

FIG. 2 shows a further exemplary embodiment of a gearbox shifting point 10 according to the invention. Both the shifting sleeve 14 and the shaft 12 or the two gearwheels 16, 18 are embodied or arranged in relation to one another in a way which is comparable to the gearbox shifting point 10 from FIG. 1. The shifting sleeve 14 from FIG. 2 has a shifting fork or armature plate 28 which is embodied in a disc shape and is arranged concentrically both to the shifting sleeve 14 and to the shaft 12. The armature plate 28 is mounted in a rotatable fashion in relation to the shifting sleeve 14 in the groove 30 provided in the shifting sleeve 14. Since the groove 30 has essentially the same width as the armature plate 28, it is virtually impossible to move the armature plate 28 in the axial direction in relation to the shifting sleeve 14.

An annular piston arrangement 32 with which the armature plate 28 can be moved to the right out of the position shown in FIG. 2 counter to the prestressing force generated by the spring 34 is provided on the left-hand side of the armature plate 28. The spring 34 is supported on the right-hand side of the armature plate 28 on a housing component 35 and comes to rest with its left-hand end on the armature plate 28. The annular piston arrangement 32 comprises an annular piston housing 36 and an annular piston 38 which is arranged so as to be moveable therein in the longitudinal direction of the shaft 12. The annular piston housing 36 can be connected via the hydraulic line 40 to a 2-position 3-way valve 42 with a hydraulic tank 44 or a hydraulic pump 46, depending on the position in which the valve 42 is located. If the valve 42 is in its right-hand position, the annular piston arrangement 32 is connected to the hydraulic pump 46 so that pressurized hydraulic fluid moves the annular piston 38 to the right. As a result, the armature plate 28 and the shifting sleeve 14 are also moved to the right so that ultimately a rotationally fixed connection can be produced between the shifting sleeve 14 and the second gearwheel 18.

Figure 3:
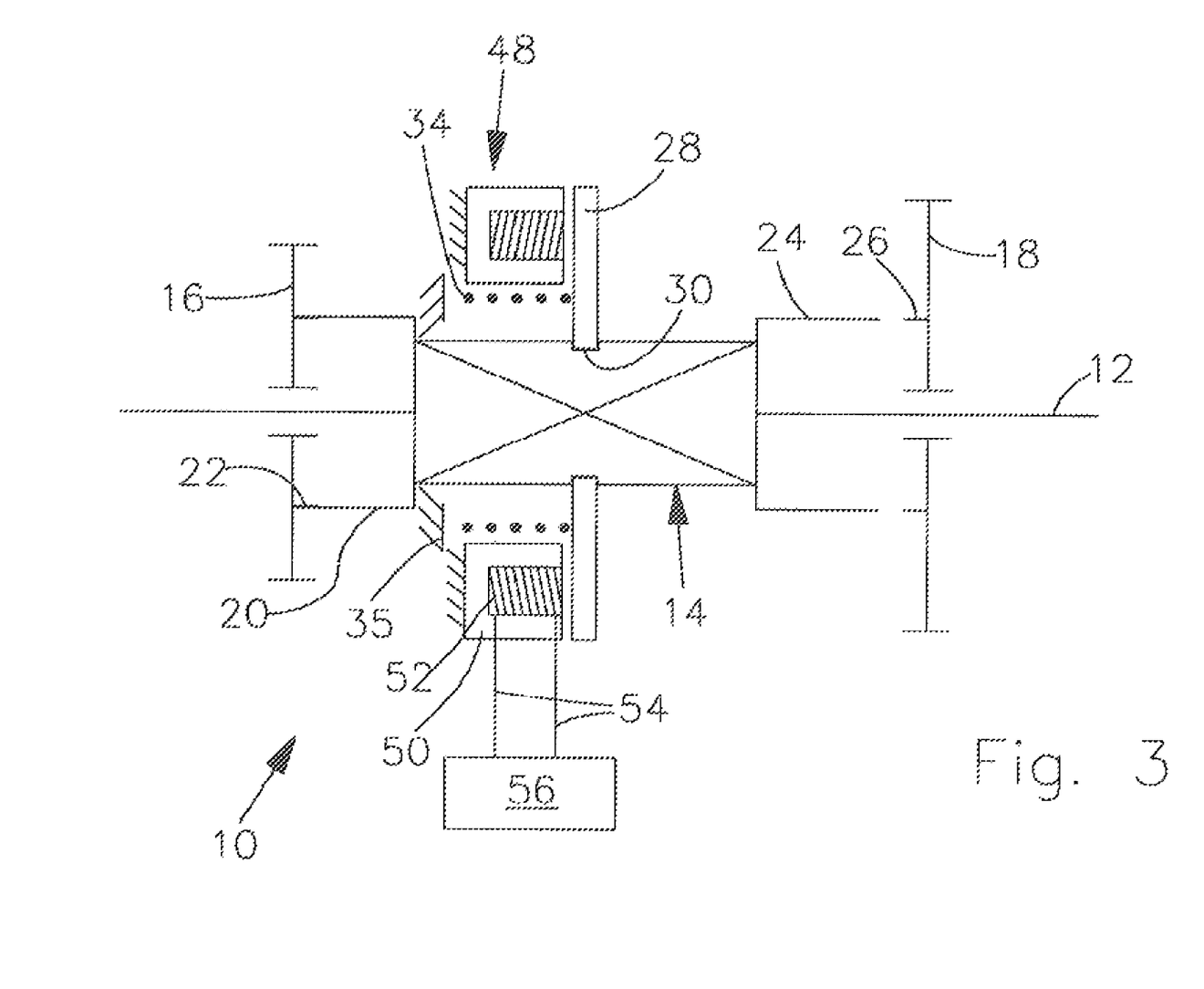
FIG. 3 shows a third exemplary embodiment of a gearbox shifting point according to the invention which is of an electromagnetically activated design.
Figure 4:
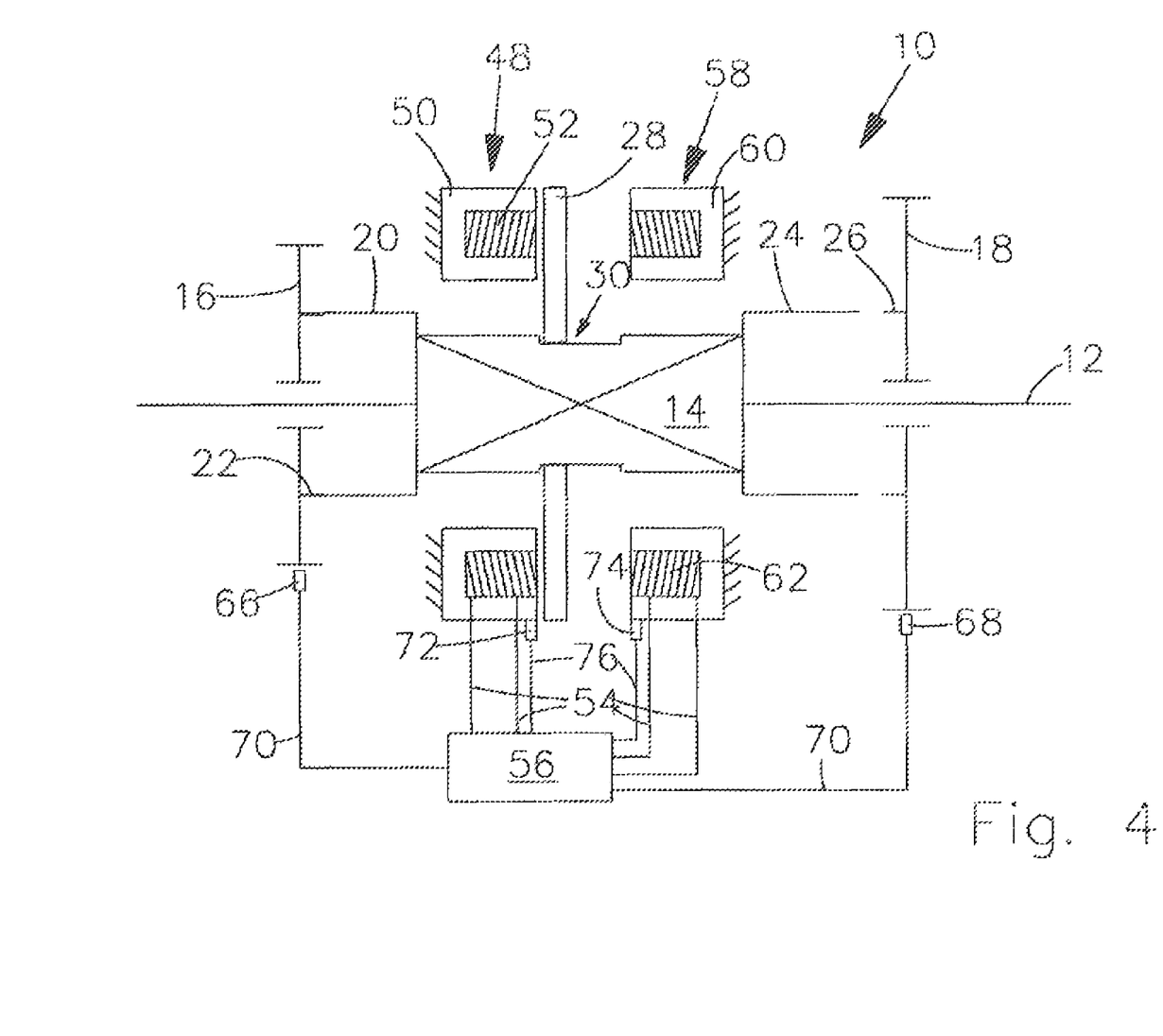
FIG. 4 shows a fourth exemplary embodiment Of a gearbox shifting point according to the invention which is of an electromagnetically activated design.
Figure 5:
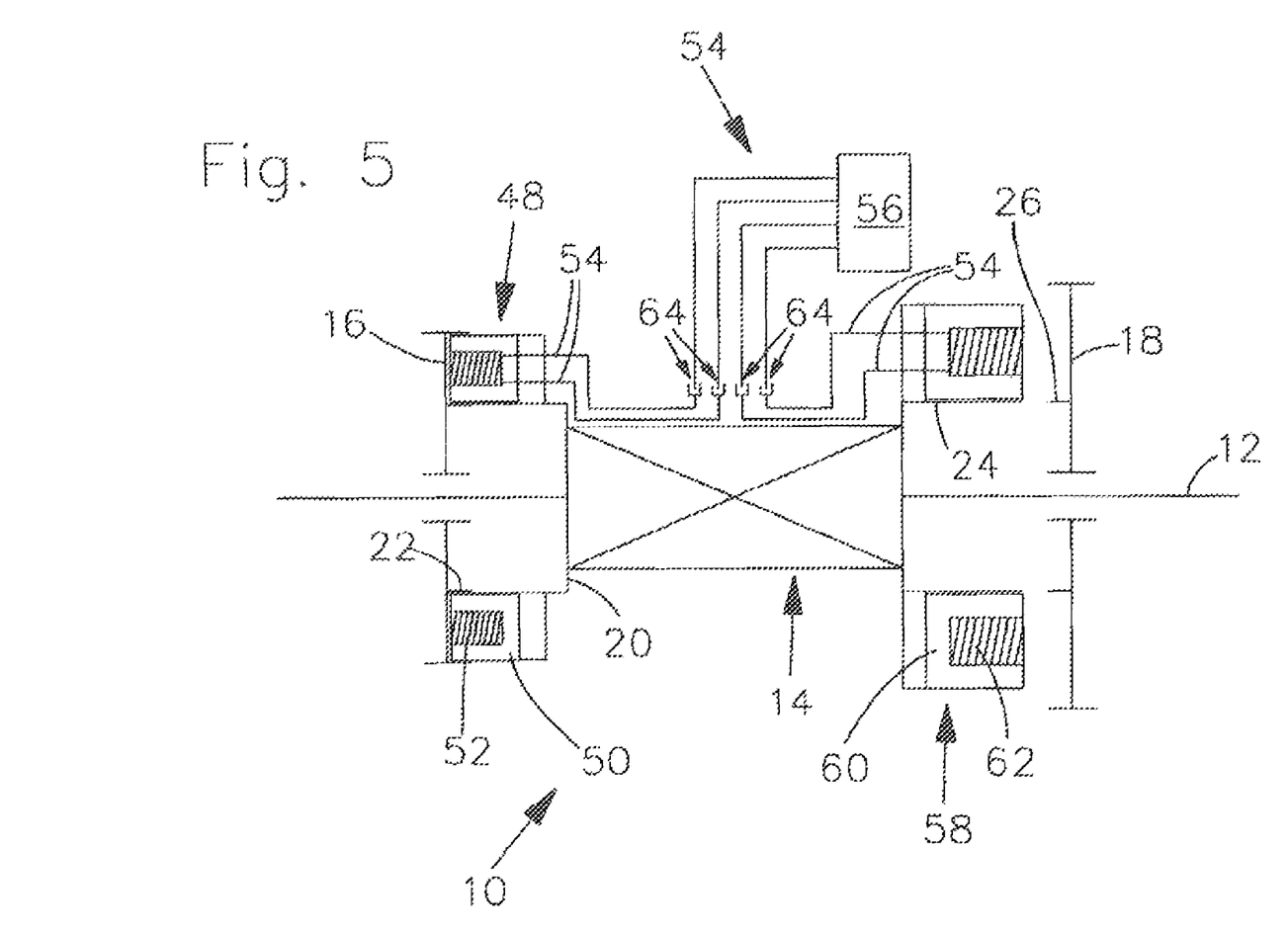
FIG. 5 shows a fifth exemplary embodiment of a gearbox shifting point according to the invention which is of an electromagnetically activated design.

In the exemplary embodiments according to FIGS. 3 to 5, the gearbox shifting point 10 can be activated electromagnetically, in the exemplary embodiment according to FIG. 3, an electromagnet 48 is provided which has a core 50 and a coil 52. The electromagnet 48 is embodied in the form of an annular pot magnet and is mounted on a gearbox housing (not shown in FIG. 3). The coil 52 of the electromagnet 48 is connected to the control unit 56 via the electric lines 54. Electric current can be applied to the coil 52 of the electromagnet 48 using the control unit 56, in which case, for the sake of simplicity, FIG. 3 does not contain a power source or voltage source or a power electronic assembly for supplying current to the coil 52 of the electromagnet 48. A spring 34, which comes to rest with its left-hand end against a gearbox housing component 35 and with its right-hand end against the armature plate 28, is also provided on the gearbox shifting point 10 from FIG. 3. The shifting sleeve 14 together with the armature plate 28 is thus prestressed into an engaged state between the shifting sleeve 14 and the second gearwheel 18. In the operating state of the gearbox shifting point 10 shown in FIG. 3, the electromagnet 48 is activated so that, on the basis of the magnetic field generated by the electromagnet 48, the armature plate 28 is attracted to the electromagnet 48 and correspondingly moved into the left-hand, engaged shifted position counter to the prestressing force generated by the spring 34. In this operating state, a rotationally fixed connection is present between the gearwheel 16 and the shaft 12 via the shifting sleeve 14 or torque is transmitted between the shaft 12 and the gearwheel 16. If the electromagnet 48 is deactivated, the shifting sleeve together with the armature plate 28 is moved again into the right-hand, engaged state owing, to the prestressing force of the spring 34.

The exemplary embodiment of a gearbox shifting point 10 according to the invention which is shown in FIG. 4 does not have, a spring 34, in contrast to the exemplary embodiment from FIG. 3. Instead, a second electromagnet 58 is provided which also ht-4 a core 60 and a coil 62. The coil 62 is also connected to the control unit 56 via electrical lines 54. The electromagnet 58 is arranged to the right next to the armature plate 28 so that the armature plate 28 is arranged between the two electromagnets 48, 58. Depending on which of the two electromagnets 48, 58 is activated, the shifting sleeve 14 together with the armature plate 28 is moved to the left or to the right so that a rotationally fixed connection can be produced either to the first gearwheel 16 and/or the second gearwheel 18. The groove 30 of the shifting sleeve 14 which is provided in FIG. 4 is made longer in the longitudinal direction of the shaft 12 than is the case in FIGS. 2 and 3. As a result, during a switching over process it is possible to ensure that the armature plate is firstly accelerated over part of the shifting path without moving the shifting sleeve 14 in the axial direction in the process. As soon as the armature plate 28 strikes against the right-hand or left-hand stop in the groove 30, the shifting sleeve 14 is correspondingly accelerated by the impulse which is caused as a result of this or by the impulse transmission which occurs as a result of this, and it is moved into the other, engaged position. As a result, a possibly present breaking loose force of the shifting sleeve 14 on one of the two gearwheels 16, 18 can quite particularly advantageously be overcome. Furthermore, owing to the relatively light-weight mass of the armature plate 28, it can be accelerated very effectively so that the shifting sleeve 14 which generally has a larger mass can be accelerated very effectively by means of the impulse. As a result, n a quite particularly advantageous way a short switching over time of the gearbox shifting point 10, which can be less than 5 ms, can be achieved.

FIG. 5 shows a gearbox shifting point 10 which is embodied in a comparable way to the gearbox shifting point 10 from FIG. 1 and which can also be activated with two electromagnets 48, 58. However, the two electromagnets 48, 58 are arranged fixed in terms of rotation to the shifting sleeve 14, specifically to the sets of clutch teeth 20, 24 of the shifting sleeve 14. Therefore, as soon as one of the two electromagnets 48, 58 is activated, it builds up a corresponding magnetic field and as a result it becomes attracted to the gearwheel 16 or 18 which is opposite this electromagnet so that the shifting sleeve 14 is also moved in the direction of the respective gearwheel 16 or 18. The electrical supply to the two electromagnets 48, 58 is also provided via electrical lines 54 from the control unit 56, but sliding contacts 64 (indicated only schematically) are provided and they can be used to transmit the electric current via the shifting sleeve 14, rotating with the shaft 12, together with the two electromagnets 48, 58 onto the line sections which are arranged fixed to the housing. In the exemplary embodiment from FIG. 5, there is thus no need for an armature plate or shifting fork.

The two gearwheels 16, 18 are mounted so as to be rotatable with respect to the shaft 12 in FIGS. 1 to 5 by means of roller bearings (not illustrated). in a comparable way, the armature plate 28 can be mounted according to FIGS. 2 to 4 by means of roller bearings so as to be capable of rotating relative to the shifting sleeve 14.

In order to determine the respective rotational speed of the gearwheel 16 or 18, in each case a rotational speed sensor 66 or 68 is provided. The rotational speed sensors 66, 68 generate an electrical signal which is dependent on the currently present rotational speed of the respective gearwheel 16, 18. This electrical signal is fed to the control unit 56 via the electrical. lines 70. By means of the electrical signals, the control unit 56 can determine the rotational speeds of the respective gearwheels 16, 18. Furthermore, two magnetic field sensors 72, 74 (FIG. 4) are provided with which it is possible to detect the strength of the respectively present magnetic field which is generated by the electromagnet 48 or 58 if this electromagnet 48, 58 is activated. The magnetic field sensors 72, 74 also generate electrical signals which are dependent on the magnetic field strength of the respective electromagnet 48, 58. As a result, by the control unit 56 detecting the magnetic field, it is possible to determine the position of the armature plate 26. Furthermore, by using the control unit 56 it is possible to detect the current strength of the electric current flowing through the coil 52 and/or 62 with a current measuring device which is not shown in the figures but is incorporated into the control unit 56. Since, given knowledge of the current strength flowing through an electromagnet 48, 58, it is possible to determine the magnetic field strength of the respective electromagnet 48, 58, and this magnetic field strength also depends, inter alia, on the position of the armature plate, contactless evaluation of the position of the armature plate can be quite particularly advantageously implemented by detecting both the magnetic field strength and, the current strength of the electric current flowing through the coil 52 or 62.

In conclusion, it is to be particularly noted that the exemplary embodiments explained above serve only to describe the claimed teaching but do not restrict said teaching to the exemplary embodiments.

Having described the preferred embodiment, it will become apparent that various modifications can be made without departing from the scope of the invention as defined in the accompanying claims.

The invention claimed is:

1. In a gearbox shifting point for producing a rotationally fixed connection between at least one gearwheel and one shaft, including a shaft, a shifting sleeve and two gearwheels, said two gearwheels each being rotatably mounted in relation to the shaft, said shifting sleeve being mounted in a rotationally secured fashion on the shaft, and said shifting sleeve and said two gearwheels being embodied in such a way that a positive locking, rotationally fixed connection can be produced between the shifting sleeve and, in each case, one of said two gearwheels, the improvement comprising:

said shifting sleeve having a pair of surface arrangements for respectively interacting a surface arrangement of each of said two gearwheels;

an armature plate arranged concentrically relative to said shaft and being joined to said shifting sleeve, whereby said shifting sleeve can be shifted by shifting said armature plate; and two electromagnets, mounted one on each side of said armature plate and being selectively activated so as to cause said armature plate to move said shifting sleeve between a first and a second engaged shifted state; and said shifting sleeve being mounted in such a way that at least one of said pair of interacting surface arrangements of said shifting sleeve is always engaged with the interacting surface arrangement of at least one of said two gearwheels during a movement of the shifting sleeve between the first and second engaged shifted states.

2. The gearbox shifting point according to claim 1, wherein said shifting sleeve is arranged between said two gearwheels.

3. The gearbox shifting point according to claim 1, wherein said pair of interacting surface arrangements of said shifting sleeve and each of said interacting surface arrangements of each of said two gearwheels is in the form of clutch teeth having the purpose of producing a positive locking connection.

4. The gearbox shifting point according to claim 3, wherein said pair of interacting clutch teeth of said shifting sleeve and the interacting clutch teeth of each of said two gearwheels are embodied in such a way that an engagement with overlap is always present between the pair of clutch teeth of the shifting sleeve and said clutch teeth of each of said two gearwheels.

5. The gearbox shifting point according to one of claim 1, wherein said shifting sleeve is mounted on the shaft by means of roller bodies and is arranged so as to be displaceable axially along said shaft.

6. The gearbox shifting point according to claim 1, wherein said two electromagnets include a radial pot magnet.

7. The gearbox shifting point according to claim 1, wherein said two electromagnets are mounted on the shaft.

8. The gearbox shifting point according to claim 1, wherein said two electromagnets are integrated into the shifting sleeve.

9. The gearbox shifting point according to claims 1, and further including an electrical control unit coupled to said two electromagnets for selectively actuating said two electromagnets for initiating a gearshifting process resulting in shifting said shifting sleeve.

10. The gearbox shifting point according to claim 9, and further including at least one rotational speed sensor with which the rotational speed of one of said two gearwheels can be determined one of directly or indirectly.

11. The gearbox shifting point according to claim 10, wherein said electrical control unit is programmed in such a way that the rotational speed condition and torque condition favorable for a gearshifting process can be determined by reference to the rotational speed information of the at least one rotational speed sensor.

12. The gearbox shifting point according to claim 9, and further including a current measuring device with which the strength of current which can be applied to said two electromagnets can be measured.

13. The gearbox shifting point according to claim 9, and further including a magnetic field strength sensor mounted for sensing a magnetic field strength in an area near to the two electromagnets.

14. The gearbox shifting point according to claim 13, wherein an activation force which is applied to said armature plate is applied in such a way that it is possible to activate the shifting sleeve even when there is a maximum force transfer between one of said two gearwheels and said shaft.

15. The gearbox shifting point according to claim 14, wherein a voltage of at least 90 V can be applied to said two electromagnets.

16. The gearbox shifting point according to claim 15, and further including an electric capacitor coupled for selectively activating said two electromagnets to thereby supply that energy which is necessary for a gearshifting process.

* * * * *